United States Patent [19]

Jost et al.

[11] Patent Number: 4,863,522
[45] Date of Patent: Sep. 5, 1989

[54] NOVEL COMPOSITIONS BASED ON C.I. PIGMENT RED 177

[75] Inventors: Max Jost, Oberwil, Switzerland; Edward E. Jaffe, Wilmington, Del.; Philippe Bugnon, Essert, Switzerland

[73] Assignee: Ciba-Geigy Corporation, Ardsley, N.Y.

[21] Appl. No.: 136,685

[22] Filed: Dec. 22, 1987

[30] Foreign Application Priority Data

Dec. 29, 1986 [CH] Switzerland ................. 5224/86
Sep. 16, 1987 [CH] Switzerland ................. 3577/87

[51] Int. Cl.$^4$ .................................... C08K 5/00
[52] U.S. Cl. ......................... 106/494; 106/493; 260/378; 544/380; 544/410; 544/108; 546/139; 546/152; 546/204; 546/348; 548/300; 548/354; 548/564; 548/579
[58] Field of Search ............. 106/288 Q, 494, 493, 106/495; 260/378; 548/579, 300, 354, 564; 546/204, 348, 152, 139; 544/380, 108, 410

[56] References Cited

U.S. PATENT DOCUMENTS

| | | | |
|---|---|---|---|
| 3,228,780 | 1/1966 | Grelat | 106/288 Q |
| 3,597,254 | 8/1971 | Graser et al. | 106/288 Q |
| 3,679,684 | 7/1972 | Dhaliwal et al. | 106/288 Q |
| 4,310,359 | 1/1982 | Ehashi et al. | 106/494 |

OTHER PUBLICATIONS

*Chemical Abstracts*, vol. 102, No. 6, Jul. 15, 1984, Abstract No. 47342c, "4–4'-Diamino-1,1'dianthraquinonyl pigment".

*Primary Examiner*—Paul Lieberman
*Assistant Examiner*—Christine A. Skane
*Attorney, Agent, or Firm*—JoAnn Villamizar

[57] ABSTRACT

A composition comprising
(a) a dianthraquinonyl pigment of formula I

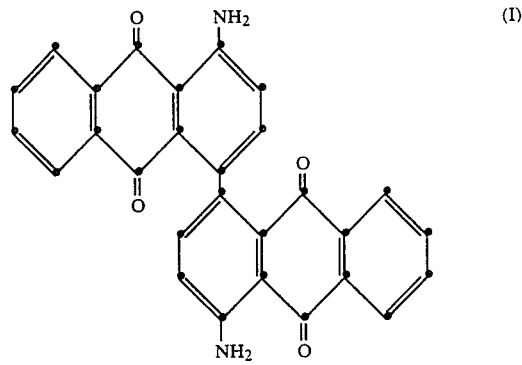

and (b) a compound of formula II

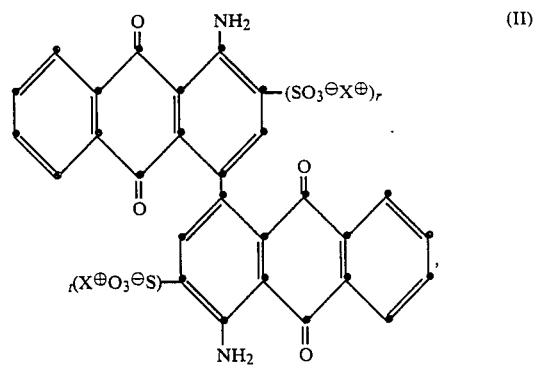

wherein $X^\oplus$ is $H^\oplus$ or a group of formula $M^{n\oplus}/n$ or $N^\oplus(R)(R_1)(R_2)(R_3)$, $M^{n\oplus}$ is a monovalent metal cation of valency n, n is 1, 2 or 3, each of R, $R_1$, $R_2$ and $R_3$ independently is hydrogen, $C_1$-$C_{18}$alkyl, $C_5$-$C_6$cycloalkyl, phenyl or phenyl which is substituted by $C_1$-$C_{18}$alkyl, or $R_2$ and $R_3$, together with the linking nitrogen atom, are a pyrrolidine, imidazolidine, piperidine, piperazine or morpholine radical, or $R_1$, $R_2$ and $R_3$, together with the linking nitrogen atom, are a pyrrole, pyridine, picoline, pyrazine, quinoline or isoquinoline radical, r and t are each independently of the other 0 or 1, with the proviso that at least one of r and t must be 1.

Especially when used in varnishes pigment mixtures of this kind are distinguished in particular by enhanced color strength and high gloss and, most particularly, by improved rheology.

5 Claims, No Drawings

NOVEL COMPOSITIONS BASED ON C.I. PIGMENT RED 177

The present invention relates to a composition comprising C.I. Pigment Red 177 and a sulfonated derivative thereof, and to the use thereof for colouring high molecular organic material.

C.I. Pigment Red 177, which has long been used for colouring high molecular organic material (q.v. U.S. patent specification 3 234 242), does not always meet the requirements of modern technology, especially as regards its rheological properties.

Although a number of proposals for improving the rheological properties of pigments have been made, they have not always led to the desired result. Thus, for example, it is known from U.S. patent specification 4 310 359 that the effects, in particular non-flocculation and crystal stability, which are obtained by mixing pigments with pigment compunds which are obtained by introducing into organic pigments substituents such as a sulfo group, a sulfonamido group, an aminomethyl group or a phthalimidomethyl group, or by mixing azo compounds with alkaline earth metal sulfonates or organic amine salts of azo dyes are not satisfactory. In the same publication, the proposal is made to improve the rheological properties of specific pigments, including also C.I. Pigment Red 177, by mixing the pigment with a pigment modified by the introduction of one or more aminosulfonamido groups.

Surprisingly, and quite contrary to the teaching of the above mentioned publication, it has now been found that, by mixing 4,4'-diamino-1,1'-dianthraquinonyl (C.I. Pigment Red 177) with a disulfonated 4,4'-diamino-1,1'-dianthraquinonyl, the rheological properties of the product are improved to an entirely satisfactory degree.

Accordingly, the present invention relates to a composition comprising (a) a dianthraquinonyl pigment of formula I

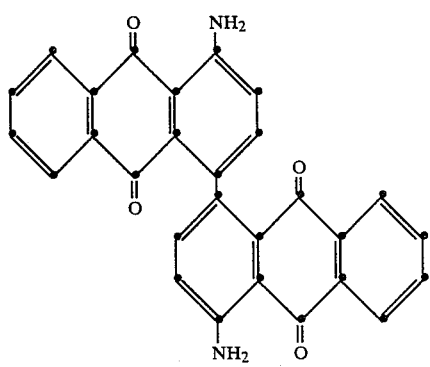

and (b) a compound of formula II

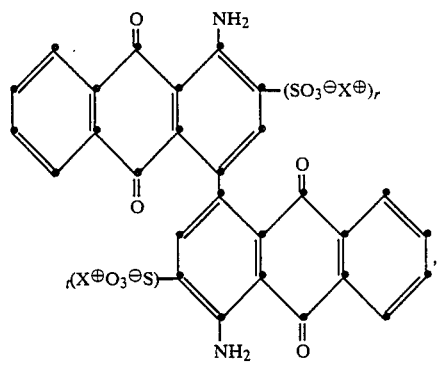

wherein $X^\oplus$ is $H^\oplus$ or a group of formula $M^{n\oplus}/n$ or $N^\oplus(R)(R_1)(R_2)(R_3)$, $M^{n\oplus}$ is a metal cation of valency n, n is 1, 2 or 3, each of R, $R_1$, $R_2$ and $R_3$ independently is hydrogen, $C_1$–$C_{18}$alkyl, $C_5$–$C_6$cycloalkyl, phenyl or phenyl which is substituted by $C_1$–$C_{18}$-alkyl, or $R_2$ and $R_3$, together with the linking nitrogen atom, are a pyrrolidine, imidazolidine, piperidine, piperazine or morpholine radical, or $R_1$, $R_2$ and $R_3$, together with the linking nitrogen atom, are a pyrrole, pyridine, picoline, pyrazine, quinoline or isoquinoline radical, r and t are each independently of the other 0 or 1, with the proviso that at least one of r and t must be 1.

$X^\oplus$ is preferably $H^\oplus$ or, most preferably, a group of formula $M^{n\oplus}/n$.

Where $X^\oplus$ is a group of formula $M^{n\oplus}/n$, is for example an alkali metal cation, an alkaline earth metal cation, an aluminium cation or a transition metal cation, for example $Na^\oplus$, $K^\oplus$, $Mg^{2\oplus}$, $Ca^{2\oplus}$, $Sr^{2\oplus}$, $Ba^{2\oplus}$, $Mn^{2\oplus}$, $Cu^{2\oplus}$, $Ni^{2\oplus}$, $Cd^{2\oplus}$, $Co^{3\oplus}$, $Al^{3\oplus}$ and $Cr^{3\oplus}$, but is preferably an alkali metal cation or an alkaline earth metal cation (n=1 or 2) and, most preferably, is $Ca^{2\oplus}$.

$C_1$–$C_{18}$Alkyl is for example methyl, ethyl, n-propyl, isopropyl, n-butyl, sec-butyl, tert-butyl, n-pentyl, tert-pentyl, hexyl, heptyl, octyl, decyl, dodecyl, tetradecyl, hexadecyl, heptadecyl or octadecyl.

R, $R_1$, $R_2$ and $R_3$ as $C_5$–$C_6$cycloalkyl may be cyclopentyl or, preferably, cyclohexyl.

R, $R_1$, $R_2$ and $R_3$ as phenyl substituted by $C_1$–$C_{18}$alkyl is preferably phenyl which is substituted by $C_{12}$–$C_{18}$alkyl.

$N^\oplus(R)(R_1)(R_2)(R_3)$ may be: $N^\oplus H_4$, $N^\oplus H_3 CH_3$, $N^\oplus H_2(CH_3)_2$, $N^\oplus H_3 C_2 H_5$, $N^\oplus H_2(C_2H_5)_2$, $N^\oplus H_3 C_3 H_7$-iso, $N^\oplus H_3$-cyclohexyl, $N^\oplus H_2$-(cyclohexyl)$_2$, $N^\oplus H_2(CH_3)(C_6H_5)$, $N^\oplus H_3 C_6 H_5$, $N^\oplus H_3$-p-octadecylphenyl und $N^\oplus(CH_3)_4$.

Preferably r and t are each 1.

The sulfonated component (b) can be prepared by methods which are known per se, for example by sulfonation with oleum, sulfuric acid, liquid sulfur trioxide, with or without a catalyst such as boric acid (q.v. German patent specification 216 891), preferably according to DE-AS 1 205 215, Example 1 (1st paragraph) and, in a further optional step, by subsequent reaction with the desired metal salt, e.g. an acetate, chloride, nitrate or, sulfate, or with one of the suitable amines. The monosulfonic acid of formula II, wherein r is 1 and t is 0, can be prepared by methods which are known per se, e.g. by partial hydrolysis with dithionite.

The compositions of this invention can be prepared by mixing the individual components (a) and (b) in the desired ratio or by partial sulfonation and subsequent reaction with a metal salt or amine as described above.

The ratios of the components of the novel compositions can vary freely. Preferred ratios are, however, from 1 to 10% by weight of component (b) to 99 to 90% by weight of component (a), most preferably from 2 to 8% by weight of component (b) to 98 to 92% by weight of component (a).

The addition of component (b) can be made before or after the conditioning of the pigment. By conditioning is meant preparing a finely particulate form, for example by precipitation in sulfuric acid, dry grinding with or without salt, kneading in the presence of salts, solvent or, preferably, wet grinding.

Depending on the method of conditioning or on the end use, it can be advantageous to add specific amounts of texture improving agents to the pigment before or after conditioning, besides the addition of component (b). Suitable texture improving agents are, in particular, fatty acids of not less than 18 carbon atoms, for example stearic or behenic acid or the amides or metal salts thereof, preferably magnesium salts, as well as plasticisers, waxes, resin acids such as abietic acid, colophonium soap, alkyl phenols or aliphatic alcohols such as stearyl alcohol or vicinal diols such as 1,2-dodecanediol, and also modified colophonium/maleate resins or fumaric acid/colophonium resins. The texture improving agents are preferably added in amounts of 0.1 to 30% by weight, most preferably of 2 to 15% by weight, based on the final product.

The compositions of this invention are suitable for use as pigments for colouring high molecular organic material.

Examples of high molecular organic materials which may be coloured or pigmented with the compositions of this invention ar cellulose ethers and esters such as ethyl cellulose, nitrocelluloe, cellulose acetate, cellulose butyrate, natural resins or synthetic resins such as polymerisation resins or condensation resins, for example aminoplasts, in particular urea/formaldehyde and melamine/formaldehyde resins, alkyd resins, phenolic plastics, polycarbonates, polyolefins, polystyrene, polyvinyl chloride, polyamides, polyurethanes, polyesters, rubber, casein, silicone and silicone resins, singly or in mixtures.

Also suitable are high molecular organic materials in dissolved form as film formers, e.g. boiled linseed oil, nitrocellulose, alkyd resins, phenolic resins, melamine resins, acrylic resins and urea/formaldehyde resins.

The above high molecular compounds may be singly or as mixtures in the form of plastics, melts or of spinning solutions, varnishes, paints or printing inks. Depending on the end use, it is advantageous to use the compositions of the invention as toners or in the form of preparations. The compositions of the invention are preferably employed in an amount of 0.01 to 30% by weight, preferably 0.1 to 10% by weight, based on the high molecular organic material to be pigmented.

The pigmenting of the high molecular organic compounds with the compositions of the invention is carried out for example by incorporating such a composition, if appropriate in the form of a masterbatch, into the substrates using roll mills, mixing or grinding machines. The pigmented material is then brought into the desired final form by methods which are known per se, for example calendering, moulding, extruding, coating, spinning, casting or by injection moulding. It is often desirable to incorporate plasticisers into the high molecular compounds before processing in order to produce non-brittle mouldings or to diminish their brittleness. Suitable plasticisers are for example esters of phoshoric acid, phthalic acid or sebacic acid. The plasticisers may be incorporated before or after working the composition into the polymers. To obtain different shades, it is also possible to add fillers or other chromophoric components such as white, coloured or black pigments, in any amount, to the high molecular organic compounds, in addition to the composition of this invention.

For pigmenting varnishes and printing inks, the high molecular organic materials and the compositions of the invention, together with optional additives such as fillers, other pigments, siccatives or plasticisers, are finely dispersed or dissolved in a common organic solvent or mixture of solvents. The procedure may be such that the individual components by themselves, or also several jointly, are dispersed or dissolved in the solvent and subsequently all the components are mixed.

The colourations obtained, for example in plastics, filaments, varnishes or prints, have good allround fastness properties such as good dispersibility, high transparency, good fastness to overspraying, migration, heat, light, and weathering.

In addition, compared with unsulfonated C.I. Pigment Red 177, the compostions of the invention have greater colour strength, improved rheology, especially in varnishes and printing inks, exhibit fewer separating phenomena such as floating out when using white pigments concurrently, have a lesser tendency to floccuate and, in finishes, have a higher gloss.

Because of the good rheological properties of the pigment compositions of this invention, it is possible to prepare varnishes with high loadings of pigment.

The compositions of this invention are preferably suitable for colouring aqueous and/or solvent-containing varnishes, especially automotive varnishes. The most preferred utility is for metallic effect finishes.

The invention is illustrated by the following Examples.

EXAMPLE 1

57 g of a moist filter cake of 4,4'-diamino-1,1'-dianthraquinonyl (solids content: B 20 g) are suspended in 390 ml of water. With stirring, 1.25 g of the disodium salt of 4,4'-diamino-1,1'-dianthraquinonyl-3,3'-disulfonic acid are then added at 20°–23° C. After stirring for 30 minutes, the suspension is heated to 70°–75° C. and the temperature is kept for 20 minutes. Then a solution of 0.5 g of calcium chloride in 30 ml of water is added over 30 minutes and the mixture is stirred for a further 30 minutes at 70° C. The precipitate is isolated by filtration and dried, affording 20.3 g of red pigment.

EXAMPLE 2

The procedure of Example 1 is repeated, using only 0.6 g of the disodium salt of 4,4'-diamino-1,1'-dianthraquinonyl-3,3'-di-sulfonic acid. Yield: 19.5 g of red pigment.

EXAMPLE 3

30 g of 4,4'-diamino-1,1'-dianthraquinonyl are stirred for 2 hours at 20° C. with 180 ml of isopropanol. After addition of 500 ml of water and 0.9 g of the disodium salt of 4,4'-diamino-1,1'-dianthraquinonyl-3,3'-disulfonic acid, the mixture is heated to 70° C. and subsequently a solution of 0.9 g of calcium chloride in 50 ml of water is added over 10 minutes. After stirring for 1 hour at 70° C., the pigment is isolated by filtration, washed with water and dried under vacuum at 80° C., affording 29.7 g of red pigment.

EXAMPLE 4

30 g of 4,4'-diamino-1,1'-dianthraquinonyl are stirred in 1000 ml of water. After addition of 0.9 g of the disodium salt of 4,4'-diamino-1,1'-dianthraquinonyl-3,3'-disulfonic acid, a solution of 0.9 g of calcium chloride in 50 ml of water is added dropwise over 30 minutes at 70°–75° C. The suspension is stirred for 2 hours at 70°–75° C. and, after cooling to 20° C., filtered. The red pigment is washed with water and dried at 80° C., affording 30.3 g of red pigment.

EXAMPLE 5

(A) 86 g of a moist filter cake of 4,4'-diamino-1,1'-dianthraquinonyl (solids content: 30 g) are suspended in water (weight of the suspension: 1075 g). With stirring, the suspension is heated to 70° C.

(B) With stirring, 1.0 g of the disodium salt of 4,4'-diamino-1,1'-dianthraquinonyl-3,3'-disulfonic acid is added in small portions to 30 ml of warm 96% sulfuric acid of 70° C. The resultant pale yellow solution is cooled to 20° C. and then, with stirring, charged to 1000 ml of water. A claret coloured precipitate falls out of the yellowish red solution. A solution forms again upon heating to 70° C.

The solution obtained in (B) is added to the suspension obtained in (A) over 3 minutes and the batch is stirred for 1 hour at 70°–75° C. In a spot test the blot runs colourless after a short time. The precipitate is isolated b filtration, washed with water until neutral and dried under vacuum at 80° C., affording 31 g of red pigment.

EXAMPLE 6

57 g of a moist filter cake of 4,4'-diamino-1,1'-dianthraquinonyl (solids content: 20 g) are suspended in water. To the suspension, which is bulked to a weight of 700 g, is added a hot solution of 70° C. of 0.6 g of the disodium salt of 4,4'-diamino-1,1'-dianthraquinonyl-3,3'-disulfonic acid in 50 ml of water. The mixture is stirred for 30 minutes at 70° C. In a spot test the blot runs red. After the dropwise addition of a solution of 0.5 g of calcium chloride in 35 ml of water, the blot runs colourless in a spot test. The mixture is stirred for 30 minutes at 70° C. and filtered. The filter cake is washed and vacuum dried at 80° C., affording 20.8 g of red pigment.

To determine the flow properties the mixed pigment thus obtained is incorporated in a conventional manner into an alkyd paint system (®Setal 84, Kunstharzfabriek Synthesis B.V., Holland; solids content: 70% by weight).

The flow properties of the mill base so obtained, which contains 12% by weight of pigment and 54% by weight of total solids, and whose pigment/binder ratio is 0.3, are determined with HAAKE viscosimeter (®Rotovisco RV 12; measuring temperature: 25° C., measuring system: SV-SP, shear range: D=0–100 [1/s]). For simple characterisation of the flow curve, viscosity values at D=10 [1/s] and 100 [1/s], calculated from an optimum regression curve, can be cited.

The following viscosity values are determined for the mill base containing the pigment mixture of Example 6:
at D=10 [1/s]: 192 mPa.s
at D=100 [1/s]: 153 mPa.s The viscosity values determined for a mill base containing untreated 4,4'-diamino-1,1'-dianthraquinonyl are:
at D=10 [1/s]: 443 mPa.s
at D=100 [1/s]: 307 mPa.s

EXAMPLES 7–14

57 g of a moist filter cake of 4,4'-diamino-1,1'-dianthraquinonyl (solids content: 20 g) are suspended in water. To the suspension, which is bulked to a weight of 700 g, is added a hot solution of 70° C. of 0.6 g of the disodium salt of 4,4'-diamino-1,1'-dianthraquinonyl-3,3'-disulfonic acid in 50 ml of water. The mixture is stirred for 20 minutes at 70°–75° C. In a spot test the blot runs red. After the dropwise addition of the respective amount of salt indicated in the following table in 50 ml of water over 15 minutes, the blot runs colourless in the spot test. The mixture is stirred for 30 minutes at 70° C. and filtered. The filter cake is washed and vacuum dried at 80° C. and the pigment is then worked up as described in Example 6.

| Example | Salt |
| --- | --- |
| 7 | 1.1 g of $BaCl_2.2H_2O$ |
| 8 | 1.1 g of $MgSO_4.7H_2O$ |
| 9 | 1.0 g of $Zn(OOCCH_3)_2.2H_2O$ |
| 10 | 1.0 g of $Al_2(SO_4)_3.16H_2O$ |
| 11 | 1.1 g of $Mn(OOCCH_3)_2.4H_2O$ |
| 12 | 1.2 g of $NiSO_4.6H_2O$ |
| 13 | 0.8 g of $CuCl_2.2H_2O$ |
| 14 | 0.7 g of KCl |

The viscosity values listed in the following table are determined for the mill bases prepared as described in Example 6 and which contain the pigment mixtures obtained according to Examples 7–14:

| Pigment mixture of Example | mPa.s at D = 10 [1/S] | mPa.s at D = 100 [1/S] |
| --- | --- | --- |
| 7 | 218 | 160 |
| 8 | 176 | 145 |
| 9 | 192 | 147 |
| 10 | 209 | 129 |
| 11 | 226 | 148 |
| 12 | 191 | 150 |
| 13 | 247 | 142 |
| 14 | 197 | 138 |
| untreated pigment: | 443 | 307 |

EXAMPLE 15

(A) 43.5 g of the disodium salt of 4,4'-diamino-1,1'-dianthraquinonyl-3,3'-disulfonic acid are dissolved in 1200 ml of water by heating to 80°–90° C. The sodium salt of the sulfonic acid is precipitated again by addition of 18.5 g of sodium carbonate. The resultant suspension is diluted with 800 ml of water. Then a mixture of 18.5 g of sodium carbonate and 25.6 g of sodium dithionite is added in portions and the mixture is stirred for 2 hours at 80°–90° C. The reaction product is isolated hot by filtration, washedwith water and dried at 80° C., affording 28.5 g of the red sodium salt of the monosulfonic acid.

(B) 57 g of a moist filter cake of 4,4'-diamino-1,1'-dianthraquinonyl (solids content: 20 g) are suspended in water as described in Example 6 and the suspension is heated to 70° C. Then a hot suspension of 70° C. of 0.6 g of the compound prepared in (A) in 50 ml of water is added. After stirring for 30 minutes, a solution of 0.5 g of calcium chloride in 35 ml of water is added dropwise over 15 minutes. Stirring is continued for 30 minutes and the reaction product is isolated by filtration. The filter cake is washed with water and dried under vacuum at 80° C., affording 19.8 g of a red pigment mixture. As in Example 6, lower viscosity values are determined for the mill base containing this pigment mixture than for the mill base containing untreated 4,4'-diamino-1,1'-dianthraquinonyl.

EXAMPLE 16

The procedure of Example 15 (B) is repeated, with the sole exception that 1.2 g instead of 0.6 g of the compound of Example 15 (A) are added, to give 20 g of a red pigment mixture which contains twice the amount of calcium salt of 4,4'-diamino-1,1'-di-anthraquinonyl-monosulfonic acid. Compared with untreated 4,4'-diamino-1,1'-dianthraquinonyl, the improvement in the rheological properties of the resultant pigment mixture is surprisingly marked.

What is claimed is:

1. A composition comprising
(a) a dianthraquinonyl pigment of formula I

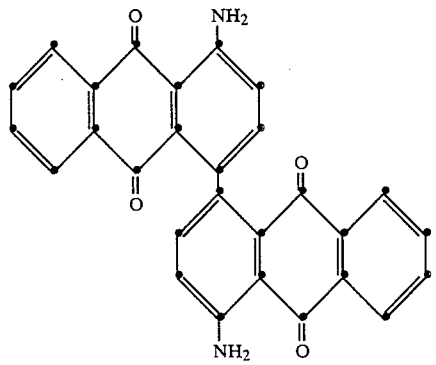

and
(b) a compound of formula II

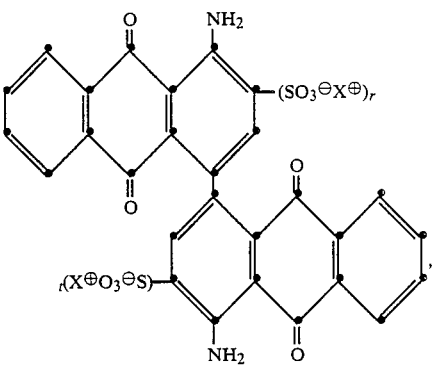

wheren $X^\oplus$ is $H^\oplus$ or a group of formula $M^{n\oplus}/n$ or $N^\oplus(R)(R_1)(R_2)(R_3)$, $M^{n\oplus}$ is a monovalent metal cation of valency n, n is 1, 2 or 3, each of R, $R_1$, $R_2$ and $R_3$ independently is hydrogen, $C_1$–$C_{18}$alkyl, $C_5$–$C_6$cycloalkyl, phenyl or phenyl which is substituted by $C_1$–$C_{18}$alkyl, or $R_2$ and $R_3$, together with the linking nitrogen atom, are a pyrrolidine, imidazolidine, piperidine, piperazine or morpholine radical, or $R_1$, $R_2$ and $R_3$, together with the linking nitrogen atom, are a pyrrole, pyridine, picoline, pyrazine, quinoline or isoquinoline radical, r and t are each independently of the other 0 or 1, with the proviso that a least one of r and t must be 1.

2. A composition according to claim 1, wherein $X^\oplus$ in the sulfonated component (b) of formula II is a group of the formula $M^{n\oplus}/n$, wherein $M^{n\oplus}$ is an alkali metal cation or an alkaline earth metal cation and n is 1 or 2.

3. A composition according to claim 2, wherein $M^{n\oplus}$ in the sulfonated compound (b) is a calcium cation.

4. A composition according to claim 1, wherein the ratio of component (a) to component (b) is 99 to 90% by weight to 1 to 10% by weight.

5. A composition according to claim 1, wherein r and t are each 1.

* * * * *